Aug. 13, 1957   C. J. KROGEL   2,802,405
POROUS ARTICLE AND METHOD OF MAKING THE SAME
Filed April 24, 1952   5 Sheets-Sheet 1
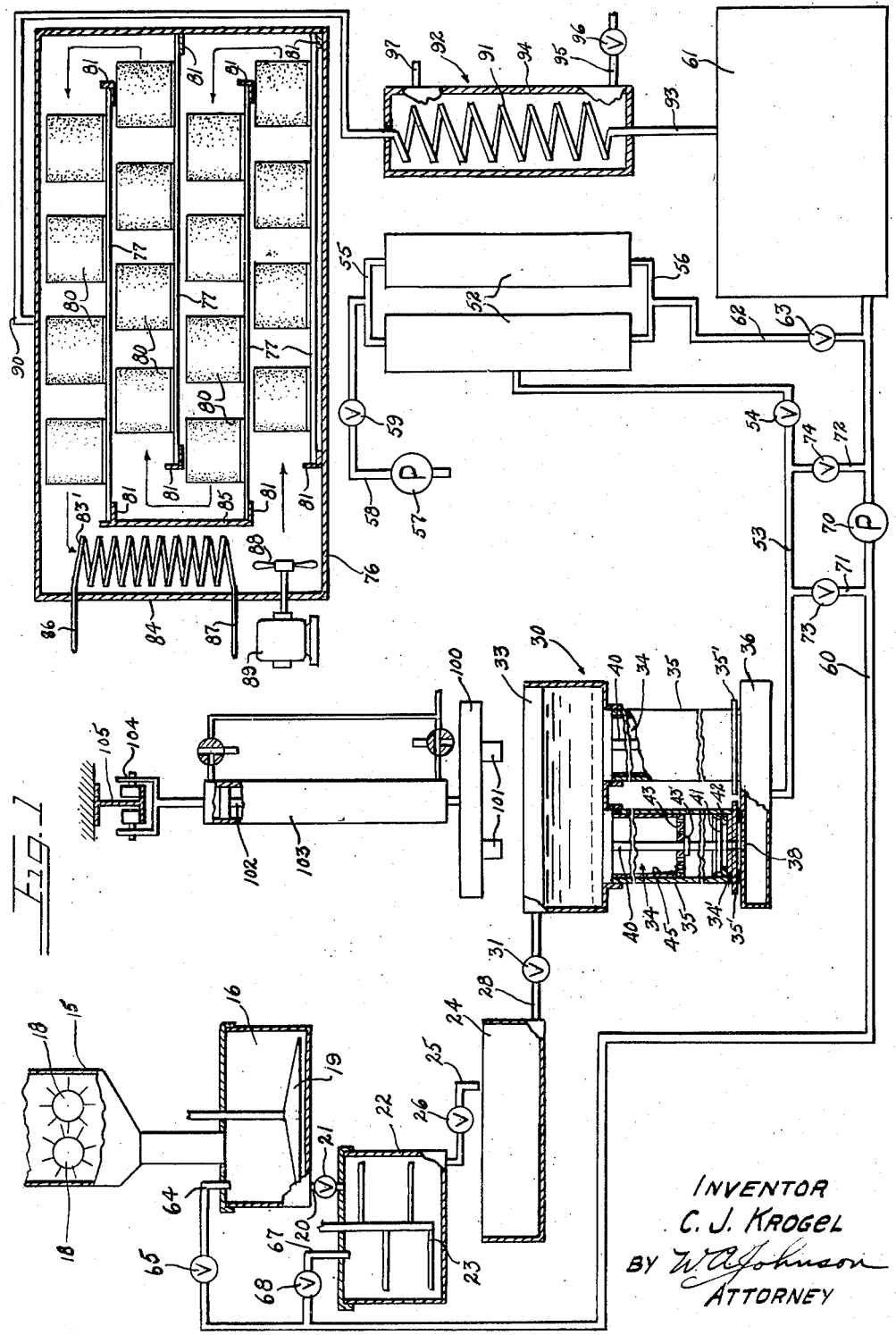
INVENTOR
C. J. KROGEL
BY W. A. Johnson
ATTORNEY

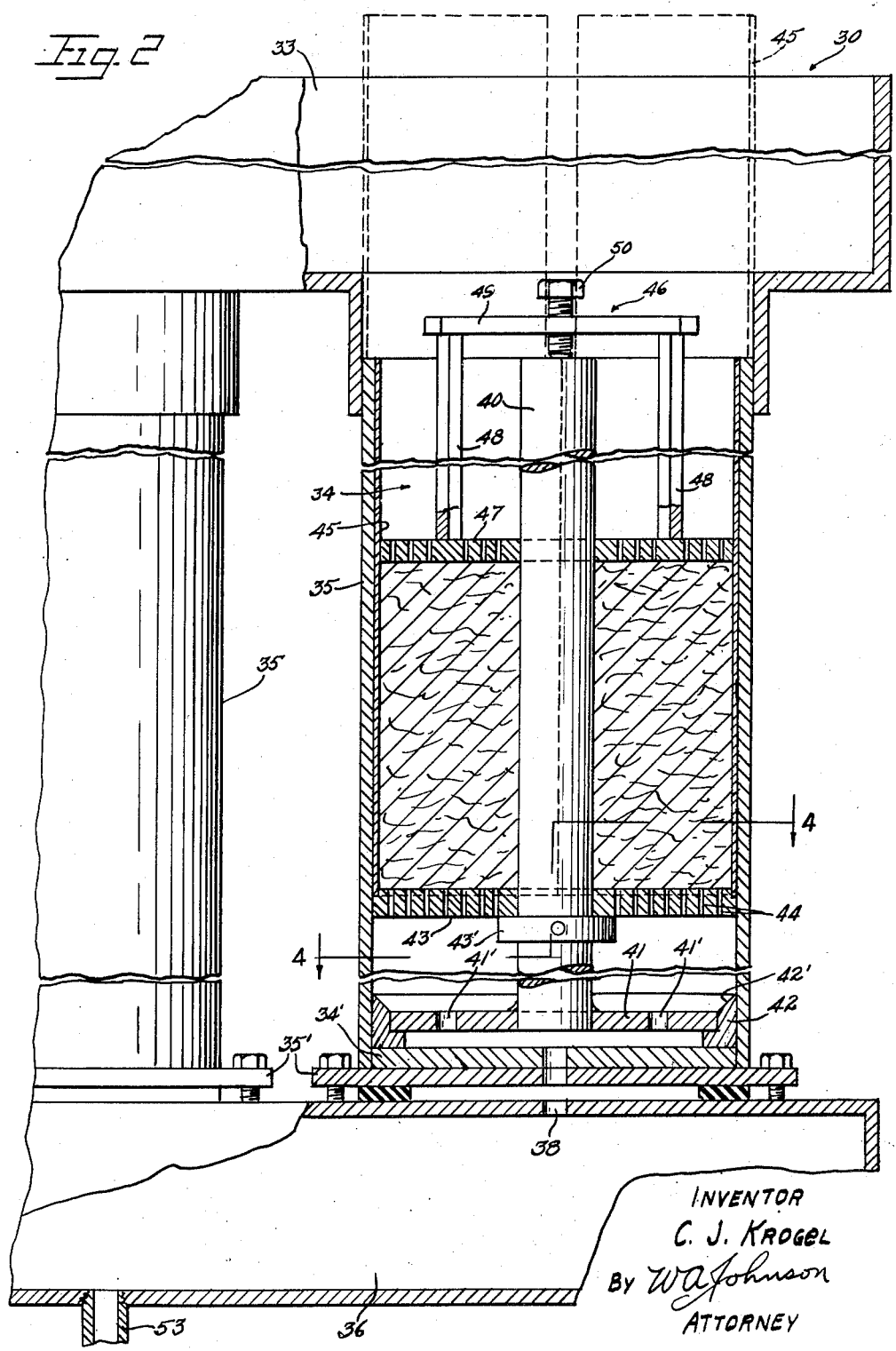

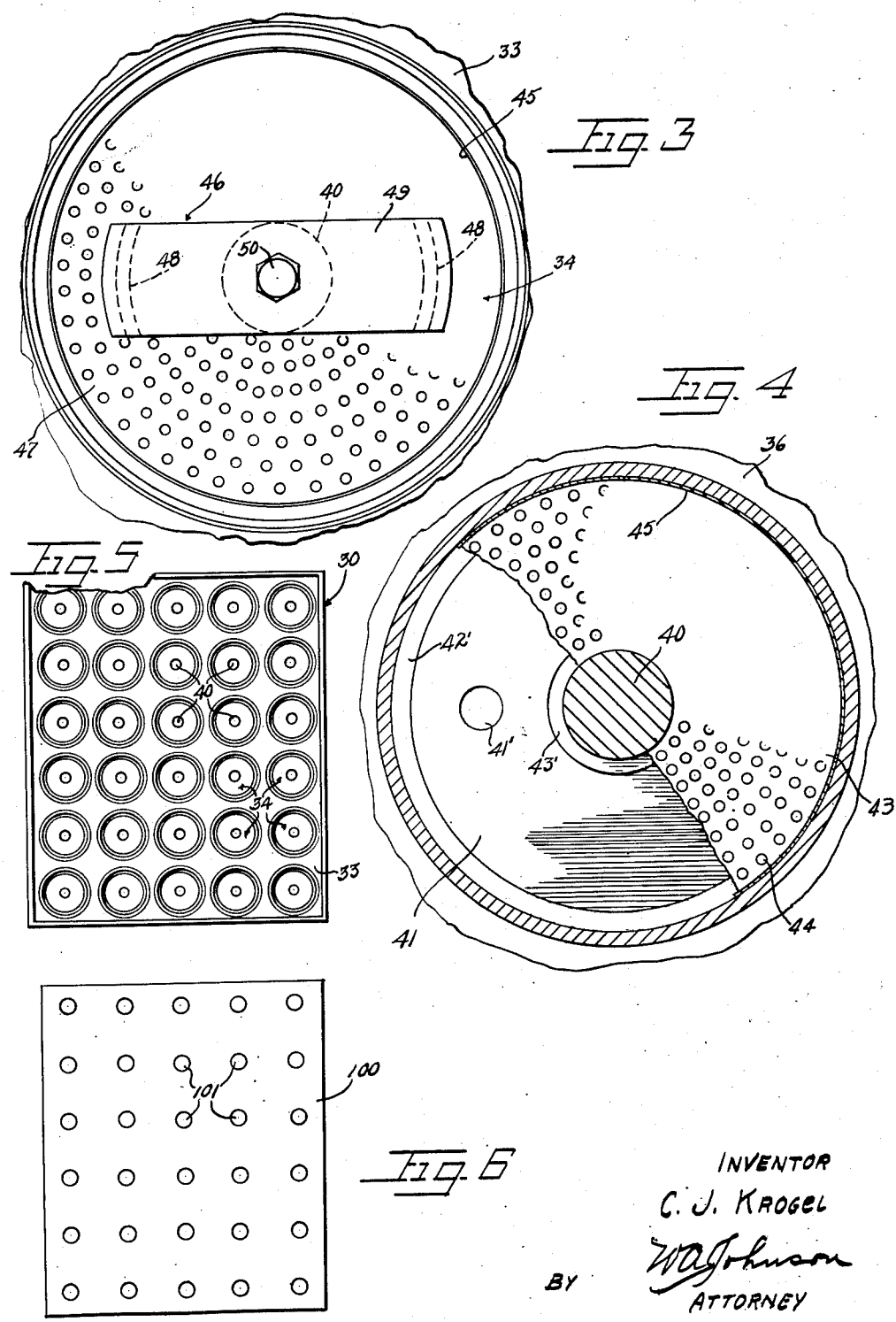

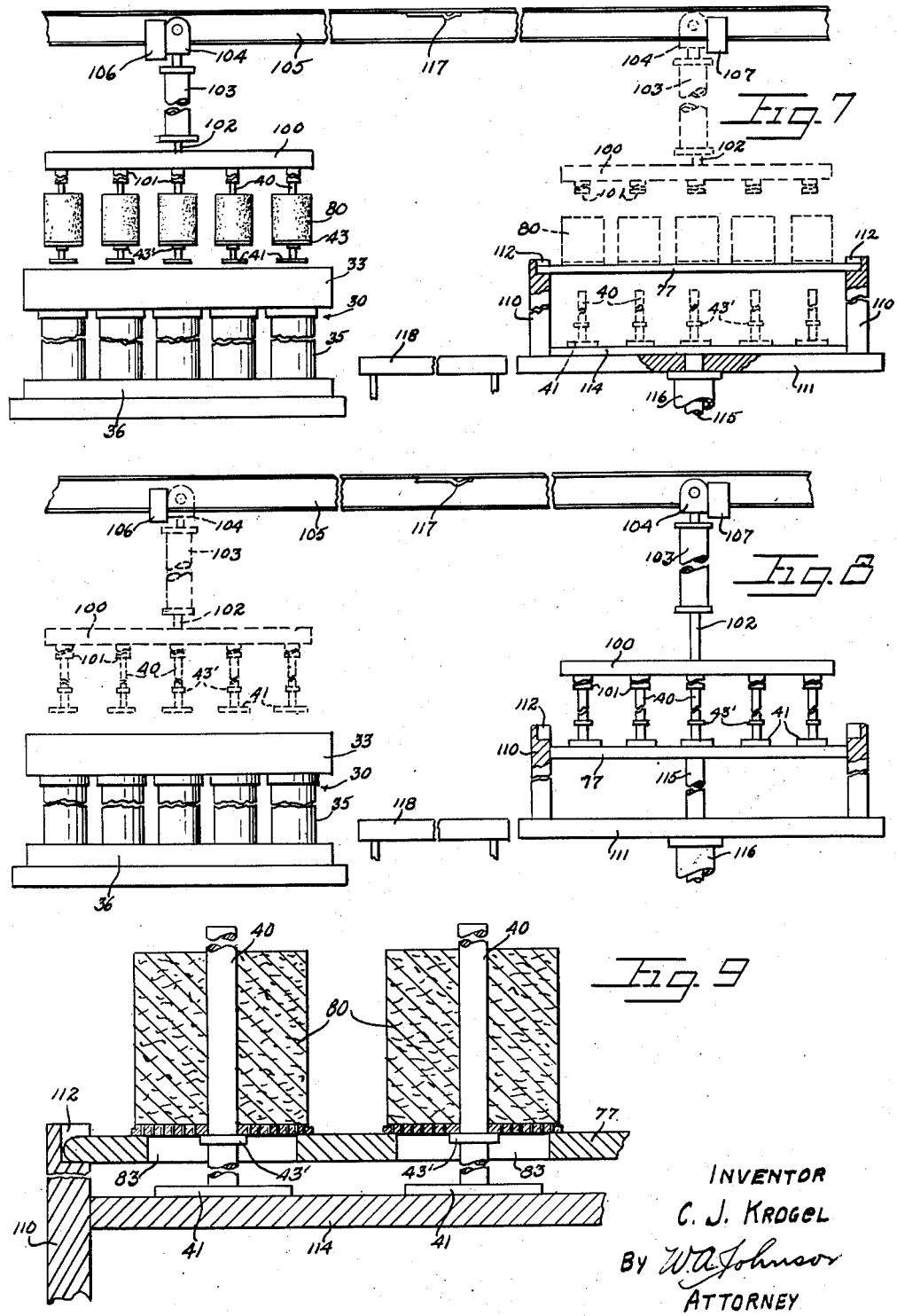

Aug. 13, 1957  C. J. KROGEL  2,802,405
POROUS ARTICLE AND METHOD OF MAKING THE SAME
Filed April 24, 1952  5 Sheets-Sheet 5

INVENTOR
C. J. KROGEL
By
ATTORNEY

United States Patent Office 2,802,405
Patented Aug. 13, 1957

2,802,405

POROUS ARTICLE AND METHOD OF MAKING THE SAME

Christopher J. Krogel, Cranford, N. J.

Application April 24, 1952, Serial No. 284,064

9 Claims. (Cl. 92—3)

This invention relates to porous articles and more particularly to fluid filters and methods of making them.

The commercially known filters are composed of various types of materials and are made in various forms in attempts to efficiently remove all foreign particles from the fluids being filtered. While some of the known materials may successfully remove the foreign particles they disturb the free passage of the fluids therethrough. Other materials permit free passage of the fluids being filtered but their efficient life in removing the foreign particles successfully is short.

Objects of the present invention are a filter which is most efficient in removing foreign particles from a fluid while allowing free passage of the fluid therethrough, and a method of making the filter.

With these and other objects in view the invention comprises a filter molded of pulp and a method of molding the filter.

In one embodiment of the invention the method of making the filter may be divided into three groups of steps, one, the material preparing steps, two, the molding and removing steps and, three, the drying and reclaiming steps. In the first steps of the method pulp is shredded, then dropped into a pulper where the pulp is defibered in a suitable liquid, such as isopropyl, methyl, ethyl or tertiary butyl alcohol or acetone and a given percentage of water if such is desired. The defibered pulp is transferred to a storage tank where it is diluted with more of the liquid and kept under constant agitation. A predetermined volume of the pulp is run from the storage tank into a measuring tank which may be emptied quickly into a mold when the mold is ready to receive it.

The mold is filled to overflowing with the liquid after which the measured quantity of pulp is caused to pass from the measuring tank onto the liquid in the mold. The major portion of the liquid, including the quantities added to pulp during the preparatory steps, is drained from the mold, assisted by vacuum, leaving the molded article of pulp which is uniform in density.

The molded article is removed from the mold and placed in an airtight oven, where the heat therein reduces the liquid remaining in the article to vapor. The vapor is drawn from the oven and through a condenser where it is returned to a liquid state and directed to the main supply of liquid.

Other objects and advantages will be apparent from the following detailed description when considered in conjunction with the accompanying drawings, wherein Fig. 1 is a schematic view of the apparatus by the aid of which the method may be practiced;

Fig. 2 is a vertical sectional view of one portion of the mold;

Fig. 3 is a top plan view of that shown in Fig. 2;

Fig. 4 is a sectional view taken substantially along the line 4—4 of Fig. 2;

Fig. 5 is a top plan view of the completed mold;

Fig. 6 is a bottom plan view of the electromagnets of the transporting unit;

Figs. 7 and 8 are front elevational views showing various steps of the method carried out by the transporting unit;

Fig. 9 is a fragmentary vertical sectional view of a tray and core support;

Figure 10:
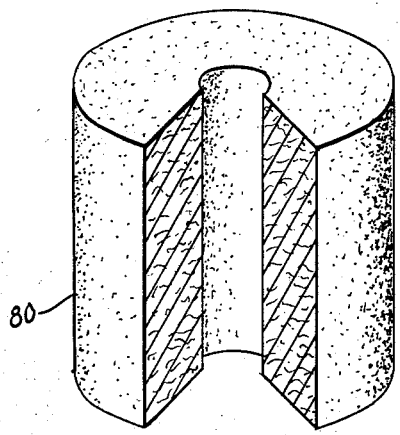
Fig. 10 is an isometric view of one species of filter, a portion thereof being cut away.

Referring now to the drawings attention is first directed to Fig. 1 which schematically illustrates the entire apparatus by the aid of which the method may be practiced for molding one species of filter. The article or filter is produced from any vegetable fiber such as wood, cotton, flax, hemp, sisal or the like referred to in general as pulp. The first step of the method is shredding the pulp in the pulp shredder 15 until a given quantity of the shredded pulp has passed into a pulper 16. The shredder is a commercially known unit having the conventional rotatable shredding elements 18. The pulper 16 is a commercially known unit also and includes the conventional driven element 19 to defiber the pulp. An outlet 20 for the pulper 16 includes a valve 21 which, when open, permits defibered pulp to pass into a supply tank 22. An agitator 23 in the supply tank 22 is rotated continuously to keep the pulp under constant agitation. A measuring tank 24 is of a given size and/or provided with suitable markings (not shown) to receive a measured quantity of pulp from the supply tank through its outlet 25 when a valve 26 therein is open. An outlet 28 for the measuring tank 24 directs the measured quantity of pulp to the mold 30 when a valve 31 in the outlet is open.

The species of mold 30 shown in Fig. 1 includes a receptacle 33 with its bottom portion provided with a plurality of apertures corresponding in size and number to the cavities 34 of the mold. A single mold cavity 34 is shown in detail in Figs. 2, 3 and 4. This mold cavity includes a hollow member 35 secured at its lower end to apertured plates 34' and 35' and mounted on a hollow suction head 36. The suction head 36 is of suitable size to support any desired number and arrangement of mold cavities 34. For example, Fig. 5 illustrates a cluster of thirty mold cavities, cylindrical in general contour, supplied by a single receptacle 33 and supported by the suction head 36. An aperture 38 is disposed in the top wall of the suction head 36 for each mold cavity. Each mold cavity is provided with a core 40 of a predetermined diameter depending on the dimensional requirements for the filter. The core 40 is mounted on a base 41 having apertures 41' therein and adapted to seat in an annular member 42 having a bevelled guiding edge 42'. A disclike element 43 having a multiplicity of perforations 44 is adapted to rest on an adjustable collar 43' and cooperate with the member 42 to position the core centrally in its mold cavity. The element 43 is grooved at its top outer edge to receive a split sleeve 45 of resilient material such as sheet metal.

Sizing elements 46, employed during one of the intermediate steps of the method, include perforated disc-like members 47, centrally apertured to receive the cores 40 and supported by vertical members 48 carried by lateral members 49. Adjustable stops or supports 50, in the form of screws disposed in threaded apertures of the lateral members, will engage their cores 40 to control the vertical dimensions of the filters.

The suction head 36 is connected to vacuum tanks 52 through a pipe line 53 which includes a valve 54. The vacuum tanks 52 are connected at both ends by pipe lines 55 and 56. A vacuum pump 57 is connected to the pipe line 55 through a line 58 which includes a valve 59. A main pipe line 60 for a storage tank 61 for the liquid is connected to the line 56 through a pipe line 62 which includes a valve 63. The main line 60 extends from the storage tank 61 to an outlet 64 above the pulper 16, adjacent to which a valve 65 is positioned in the main line. Another outlet 67 extends from the main line to a position above the pulp supply tank 22 and is provided with a valve 68. A pump 70 in the main line 60 will force the liquid where desired from the storage tank 61. Auxiliary lines 71 and 72 connecting the main line 60 with line 53 upon each side of the pump 70 include valves 73 and 74 respectively.

An airtight oven 76, shown schematically in Fig. 1, is provided with suitable doors (not shown) on the front thereof whereby trays 77 of molded filters 80 may be positioned in and removed from the oven readily. The trays are identical in size and structure and may be positioned on any of the pairs of supports 81, which are mounted in staggered relation to cause the trays to produce a zig-zag path for heated air and vapor through the oven. As shown in Fig. 9, each tray 77 has apertures 83 at the positions where the filters 80 will be supported in alignment with the apertures in the filters. A heating coil 83', disposed in the oven 76 between the adjacent wall 84 and a partition 85, has an inlet line 86 and an outlet line 87 connected to a steam supply (not shown). A fan 88 driven by a motor 89 is positioned beneath the coil 83' and adjacent the entrance end of the first or bottom passageway in the oven. A pipe line 90 connected to the top of the oven receives the vapors, resulting from the quantities of the liquid remaining in the filters, and directs them through a coil 91 of a condenser indicated generally at 92. A line 93 connects the coil 91 to the storage tank 61. A tank 94 of the condenser 92 is connected to a water supply through a supply line 95 under the control of a valve 96. An outlet line 97 is connected to the tank near the top thereof causing the water entering the tank near the bottom thereof to surround the coil and cool it to condense the vapors to a liquid before they enter the storage tank.

To remove the filters from the cavities of the mold 30 and place them in their respective positions on one of the trays 77, a transfer element 100 having electromagnetic units 101 spaced from each other according to the spacing of the cores 40 is carried by a piston rod 102 of an air cylinder 103. The air cylinder is suspended from a carriage 104 riding on a fixed position track 105. A stop 106 on the track 105 will position the transfer element 100 with the units 101 in alignment with their respective cores 40. A stop 107 mounted on the track 105 will position the transfer element to centrally align the cores 40, the filters 80 and their perforated elements 43 with the apertures 83 in the tray located in its loading supports 110. The loading supports 110 are mounted at given spaced positions relative to the stop 107 on a table 111 and have recesses 112 in their upper ends to locate the trays singly in the desired position. A platform 114 positioned between the loading supports 110 is supported for movement by a position rod 115 of an air cylinder 116 mounted on the underside of the table with the piston rod extending through an aperture in the table.

In practicing the method by the aid of the apparatus either unbeaten or beaten pulp, depending on the desired density for the filters to be molded, is fed to the shredder 15 until the desired amount of shredded pulp is deposited in the pulper 16. The pulp before being fed to the shredder should not contain more than 20 percent water. A predetermined quantity of the liquid in the storage tank 61 is forced by the pump 70 from the outlet 64 when the valve 65 is open. The liquid, whether it be isopropyl, methyl, ethyl or tertiary butyl alcohol, acetone or any other suitable liquid may contain a given percentage of water. The presence of a given percentage of water in the liquid is helpful in defibering the pulp, but to obtain the best results the water content should be as low as possible. It is recommended that not more than 30 percent water be present in the liquid, a smaller percentage of water being preferred.

After the pulp in the unit 16 has been defibered it is transferred to the supply tank 22 where it is diluted with an additional quantity of the liquid and kept under continuous agitation. The diluted pulp is ready then to pass into the measuring tank 24 by opening the valve 26. The amount of pulp transferred to the measuring tank depends upon the sizes and number of the mold cavities, and also the height and density required for the filters.

The mold 30 is provided with the cores 40, the split sleeves 45, and the perforated elements 43 and before the measured quantity of pulp is transferred to the mold the mold cavities are filled to overflowing with liquid from the storage tank 61. This is accomplished by opening valve 73 while valve 54 is closed after which the valve 73 is closed. When the measured quantity of pulp leaves the tank 24 by opening valve 31, it will enter the receptacle 33 and lie uniformly over the mold cavities so that like quantities of the pulp will pass into the mold cavities when the liquid is removed therefrom. The pulp in the receptacle 33 may be agitated to produce further dilution and even distribution of the fibers.

While the pulp is being delivered from the measuring tank 24 into the receptacle 33 of the mold the vacuum pump 57 may be energized with the valve 59 open to evacuate the tanks 52, after which the valve 59 is closed. With valves 59, 63, 73 and 74 remaining closed, valve 54 may be opened connecting the vacuum tanks 52 to the suction chamber 36 causing suction of most of the liquid from the mold cavities and from pulp in the mold cavities. During the suction of the liquid from the mold the sizing elements 46 may be lowered into the mold cavities manually or by the aid of the transfer element 100 and the adjustment screws allowed to rest on their respective cores 40. The suction may continue after the sizing step is completed as the members 47 of the sizing elements 46 are perforated. The presence of a high percentage of alcohol, or other water-soluble liquid in the liquid, permits rapid draining of the liquid from the mold without disturbing the density and contour of the filters or molded articles. The vacuum tanks 52 receive the drained liquid to prevent any loss thereof due to evaporation. Without the vacuum tanks the vapors would be discharged into atmosphere.

When the molding steps have been completed valve 54 is closed and valve 63 opened to allow the liquid to drain into the storage tank 61. The sizing elements 46 may be removed by energizing of the units 101 of the electromagnet 100 when moved into engagement with the screws 50 of the sizing elements. Then operation of the air cylinder 103 followed by movement of the carriage 104 to a spring stop 117 will transfer the sizing elements 46 to any suitable support 118 where they may be deposited and allowed to rest in their properly spaced positions to be transported back to their respective mold cavities during the next molding steps. When the electromagnets 101 of the transfer unit 100 have been deenergized to free the sizing elements 46 they may be returned to the mold and positioned in engagement with the cores 40. The electromagnets are energized again and the air cylinder 103 operated to remove the cores with the perforated elements 43 and the molded articles 80. The sleeves 45 will move with the molded articles until they leave the members 35 when they will expand and remain in the apertures of the receptacle 33. The carriage may be moved beyond the spring stop 117 to the stop 107 at which time the electromagnets 101 and the articles carried thereby will be positioned in alignment with their respective apertures 83 of a tray 77 positioned in the recessed ends 112 of the supports 110. At this time the platform 114 is positioned adjacent the tray. When the air cylinder 103 is operated to lower the perforated elements 43 and articles 80 onto the tray, the cores 40 will enter their apertures 83 of the tray and come to rest on the platform 114 as shown in Fig. 9. The electromagnets 101 are deenergized after which the air cylinder 116 is operated to lower the platform and allow the cores to move out of their articles and perforated elements as shown in dotted lines in Fig. 7.

The filled tray of articles is transferred to the oven 76 where it, with other loaded trays divides the oven into passageways. When the oven is loaded with trays of articles, as shown in Fig. 1, the doors of the oven are closed, the steam directed through the coil 83 and the motor 89 for the fan 88 energized. Although about ¾ of the weight of the wet article is still liquid and it is necessary to recover this liquid by drying, almost all of the liquid was removed from the pulp of the articles while in the mold, the pulp fibers will be damp. The circulation of the heated air in the oven in the direction of the arrows will vaporize the remaining liquid, causing it to leave the oven through line 90 into the coil 91 of the condenser 92 where the vapors will be condensed to liquid and returned to the storage tank 61. The dried filters, with their trays, may be removed from the oven and assembled individually in their perforated containers 120 with their ends 121 solid excepting the center apertures which are in registration and possibly sealed to the perforated tube 122 when covered with at least one complete layer of a suitable cloth 123.

This species of the invention is a complete oil filter insert for use in lubricated units such as automobiles, trucks aeroplanes or the like. In this species of the invention the filter 80 has a predetermined variable uniform density. For certain purposes it may be desirable to have filters of the species shown at 125 in Fig. 12 composed of two or more portions. In this species the portions 126 and 127 may be molded separately in molds identical with the mold 30 but with cavities and cores of the necessary sizes to obtain the desired result. Furthermore, if desired the portions 126 and 127 may be formed in a single mold having cavities similar to those in the mold 30 but with thin tubular dividers connected to the perforated element 43 and extending higher than the main mold cavities to receive greater quantities of pulp per cubic inch of space. With this species of filter the portion with less density is positioned to receive the fluid, such as oil, first to remove the larger portions of foreign matter after which the portion with greater density will remove the remaining foreign particles.

Figure 13:
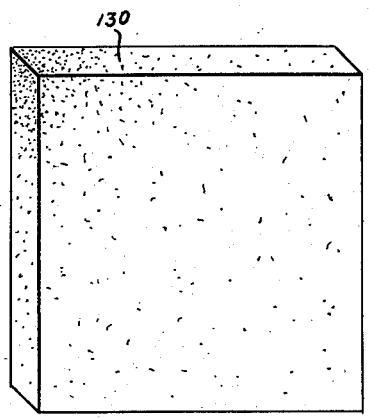
Figure 14:
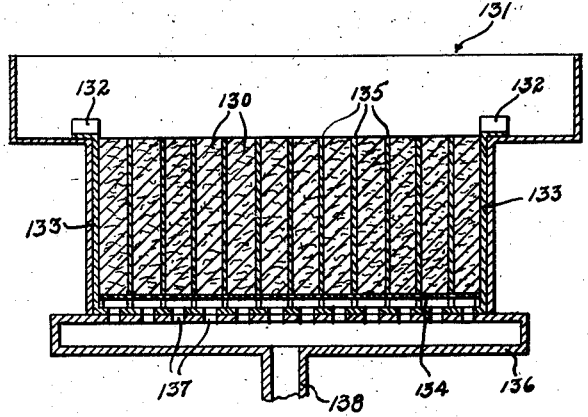
Fig. 14 is a vertical sectional view of a mold for molding the species of filter shown in Fig. 13.

The species of filter 130 shown in Fig. 13 is substantially square and of a desired thickness depending on the size required. The method of molding this species of filter is identical to that for molding the filter 80 with the exception of the contour of the mold. If a mold 131 shown in Fig. 14 should be substituted for the mold 30 shown in Fig. 1 and the positions of the electromagnets 101 on the transfer element 100 changed to correspond to portions 132 on the uprights 133 of a perforated element 134, a plurality of the filters could be molded simultaneously. The mold 131 has mold cavities provided by partitions 135 equally or variably spaced and having their side edges positioned in vertically extending grooves in the sides of the mold. The vacuum or suction chamber 136 is identical with the chamber 36 with apertures 137 to the mold cavities through the perforated element 134 and a pipe line 138 which may be connected to the pipe line 53. All the method steps carried out with the mold 30 may be carried out with the mold 131 including sizing of the molded articles 130 with a single or a plurality of connected perforated sizing elements formed to enter the mold cavities.

Heretofore, articles have been molded from pulp and water mixtures in pressure molds where the mixtures have been held under pressure in the molds until dry to prevent warping. The commercially known articles molded of pulp and water are thin walled such as plates and egg containers and these articles, regardless of their contours, could not serve efficiently as filters.

To serve efficiently as a filter, regardless of the fluid being filtered, the article must be much thicker than the pressure molded articles to remove the foreign particles from the fluids for a suitable length of time. Furthermore, the densities of the pulps must be controlled readily to produce the most efficient filters for the numerous fluids to be filtered. For some fluids the filter therefore may require a low density of less than one half gram per cubic inch while for other fluids the density of the pulp may be higher. These requirements depend on the fluids to be filtered, the pressure of the fluids and the sizes or conditions of the foreign particles in the fluids. In all instances the densities of the filters are much lower than the densities of the articles produced in the pressure molds from the pulp and water mixtures. To accomplish these desired results the pulp before shredding must not contain more than twenty percent water and the liquid in the pulper must not contain more than thirty percent water.

Figure 11:
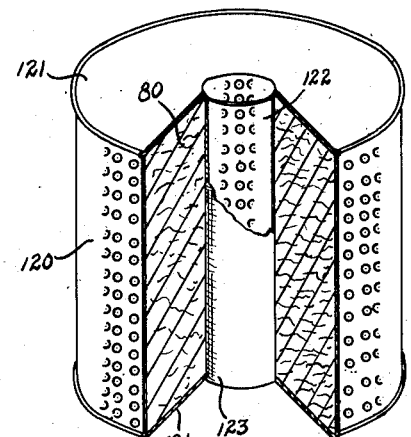
Fig. 11 is an isometric view of this species of filter in a complete filter unit filler, a portion being cut away.
Figure 12:
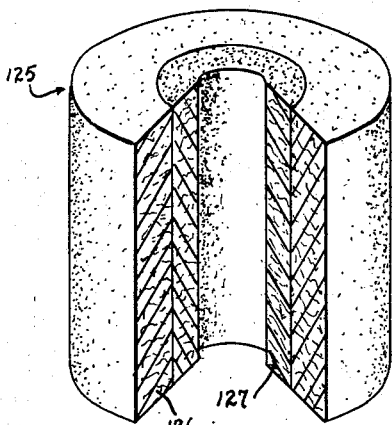
Figs. 12 and 13 are isometric views of other species of filters.

The filters shown in Figs. 10, 11 and 12 are particularly adapted for filtering vegetable or mineral oils or various petroleum products such as gasoline. The filter shown in Fig. 13 is particularly adapted for filtering air or other gasses and may serve for insulation, sound proofing and packaging.

The production of these articles into easily controlled uniform structures with uniform, selectively variable densities, is made possible with the use of little or no water in the pulp. There may be a certain low percentage of water in the pulp before it reaches the shredder depending on the humidity of the room in which the pulp is stored. Furthermore, a small quantity of water may facilitate defibering the pulp but it is not necessary for this purpose. However, after the addition of the large quantities of water-soluble liquid, selected from the aforementioned group, to the pulp in the pulper 16, the supply tank 22 and the mold 30 or 131, the percentage of water in the pulp is so low it is negligible. This liquid will move downwardly freely out of the mold at a rapid rate of drainage assisted by gravity, and at a much more rapid drainage rate, as compared to the use of water, when assisted by suction. This liquid falls free of the pulp fibers whereas water clings to them tending to pull them down to produce greater and nonuniform densities in the product and to greatly multiply the drainage time and the overall manufacturing time. This condition which exists with the use of water would result in other undesirable conditions, such as warping and shrinking during drying and excess settling of the pulp should suction be employed to shorten the drainage time. In the present method substantially uniform higher densities may be produced in the articles without the addition of water or the disturbance of the rapid drainage of the liquid by using beaten pulp and/or the use of the sizing element with greater quantities of pulp. Furthermore, the articles may be conditioned to efficiently filter fluids that contain water, alcohol, or other liquids without wetting the fibers and causing them to collapse by the use of a binder in the liquid or the pulp. Resins such as the phenolics that are soluble in alcohol, or alcohol-water mixtures may be dissolved in the liquid. The binder material will impregnate the fibers and remain in the pulp during drainage of the major portion of the liquid therefrom. During drying of the articles in the oven the remaining liquid will evaporate leaving the binding agent surrounding the pulp fibers. The binding agent will thermoset at the elevated temperature in the oven and become insoluble in either alcohol or water. This result which gives added strength to the articles, is produced, not by varying the previous defined method steps but by those steps and one additional step, the adding of the binding material to the liquid. The sleeves 45 of one species and the partitions 135 of another make possible the molding of articles of known uniform sizes and densities which may be lower than one-half gram per cubic inch. The sleeves and partitions eliminate frictional disturbances which would cause compressing articles removed from stationary molds. If desired these articles may be impregnated with protective materials such as plastics, resins or waxes depending on their use.

It is to be understood that the above described arrangements are simply illustrative of the application of the principles of the invention. Numerous other arrangements may be readily devised by those skilled in the art which will employ the principles of the invention and fall within the spirit and scope thereof.

What is claimed is:

1. The method of forming a porous article with the use of a perforated mold comprising the steps of mechanically defibering in a pulper a quantity of vegetable fiber pulp containing not more than 20% water in a liquid medium composed primarily of liquid having substantially no affinity for the pulp fibers and taken from a group consisting of alcohol and acetone and containing not more than 30% water, using the liquid as a carrier for the defibered pulp, causing the liquid to flow through the perforated mold and in flowing thus cause the defibered pulp to pile up and form an article, and passing the liquid flowing through said mold to a storage tank for use in pulping and molding in succeeding cycles.

2. A porous article molded of vegetable pulp fibers, having a thickness greater than ¼ inch and a density of pulp content of less than 3 grams per cubic inch, and prepared by the method of claim 1.

3. The method of forming a porous article with the use of a perforated mold comprising the steps of mechanically defibering in a pulper a quantity of vegetable fiber pulp containing not more than 20% water in a liquid medium composed primarily of liquid having substantially no affinity for the pulp fibers and taken from a group consisting of alcohol and acetone and containing not more than 30% water, using the liquid as a carrier for the defibered pulp, causing the liquid to flow through the perforated mold and in flowing thus cause the defibered pulp to pile up and form an article, increasing the speed of the flow of the liquid through said mold by suction, and passing the liquid flowing through said mold to a storage tank for use in pulping and molding in succeeding cycles.

4. The method of forming a porous article with the use of a perforated mold comprising the steps of mechanically defibering in a pulper a quantity of vegetable fiber pulp containing not more than 20% water in a liquid medium composed primarily of liquid having substantially no affinity for the pulp fibers and taken from a group consisting of alcohol and acetone and containing not more than 30% water, using the liquid as a carrier for the defibered pulp, causing the liquid to flow through the perforated mold and in flowing thus cause the defibered pulp to pile up and form an article, passing the liquid flowing through said mold to a storage tank for use in pulping and molding in succeeding cycles, and heating the molded pulp to dry it.

5. The method of forming a porous article with the use of a perforated mold comprising the steps of mechanically defibering in a pulper a quantity of vegetable fiber pulp containing not more than 20% water in a liquid medium composed primarily of liquid having substantially no affinity for the pulp fibers and taken from a group consisting of alcohol and acetone and containing not more than 30% water, using the liquid as a carrier for the defibered pulp, causing the liquid to flow through the perforated mold and in flowing thus cause the defibered pulp to pile up and form an article, passing the liquid flowing through said mold to a storage tank for use in pulping and molding in succeeding cycles, and compressing the defibered pulp on the mold to form an article thereof of a predetermined size, the pulp content of which has a density of less than three grams per cubic inch.

6. The method of forming porous articles in a mold having a perforated bottom comprising the steps of mechanically defibering in a pulper a quantity of vegetable fiber pulp containing not more than 20% water in a liquid medium composed primarily of liquid having substantially no affinity for the pulp fibers and taken from a group consisting of alcohol and acetone and containing not more than 30% water, using the liquid as a carrier for the defibered pulp, pouring a measured quantity of the liquid carried defibered pulp into the mold so that the defibered pulp will pile up from the perforated bottom while the liquid medium flows through said perforated bottom, passing the liquid flowing through said mold to a storage tank for use in pulping and molding in succeeding cycles, compressing the defibered pulp to a predetermined point in said mold, and controlling the final density of the article by varying the quantity of liquid carried defibered pulp initially poured into said mold.

7. The method of forming a porous article with the use of a perforated mold comprising the steps of mechanically defibering in a pulper a quantity of vegetable fiber pulp containing not more than 20% water in a liquid medium composed primarily of liquid having substantially no affinity for the pulp fibers and taken from a group consisting of alcohol and acetone and containing not more than 30% water, using the liquid as a carrier for the defibered pulp, causing the liquid to flow through the perforated mold and in flowing thus cause the defibered pulp to pile up and form an article, passing the liquid flowing through said mold to a storage tank for use in pulping and molding in succeeding cycles, heating the formed article to expel the remaining liquid therefrom in vapor form, removing the vapors from the area of the formed article, and condensing the vapors to liquid.

8. The method of forming a porous article with the use of a perforated mold comprising the steps of mechanically defibering in a pulper a quantity of vegetable fiber pulp containing not more than 20% water in a liquid medium composed primarily of liquid having substantially no affinity for the pulp fibers and taken from a group consisting of alcohol and acetone and containing not more than 30% water and containing an impregnating agent insoluble in water and the liquid when thermoset, using the liquid as a carrier for the defibered pulp, causing the liquid to flow through the perforated mold and in flowing thus cause the impregnated fibers to pile up and form an article, passing the liquid flowing through said mold to a storage tank for use in pulping and molding in succeeding cycles, and heating the article to evaporate the remaining liquid and thermoset the impregnating agent.

9. A porous article molded of vegetable pulp fibers, having a thickness greater than ¼ inch and a density of pulp content of less than three grams per cubic inch, and prepared by the method of claim 8.

References Cited in the file of this patent

UNITED STATES PATENTS

| Number | Name | Date |
|---|---|---|
| 499,427 | Hubbard | June 13, 1893 |
| 797,122 | Kiefer | Aug. 15, 1905 |
| 804,432 | Rivers | Nov. 14, 1905 |
| 1,426,842 | Swift | Aug. 22, 1922 |
| 1,595,312 | O'Brien | Aug. 10, 1926 |
| 1,599,384 | O'Brien | Sept. 7, 1926 |

(Other references on following page)

UNITED STATES PATENTS

| | | | |
|---|---|---|---|
| 1,630,424 | Haanen | May 31, | 1927 |
| 1,764,660 | Sweetland | June 17, | 1930 |
| 1,846,474 | Darling | Feb. 23, | 1932 |
| 1,873,585 | Harvey | Aug. 23, | 1932 |
| 1,891,027 | Richter | Dec. 13, | 1932 |
| 1,901,984 | Pieper et al. | Mar. 21, | 1933 |
| 1,959,965 | Richter | May 22, | 1934 |
| 2,008,021 | Kenety | July 16, | 1935 |
| 2,022,654 | Dreyfus | Dec. 3, | 1935 |
| 2,060,068 | Groombridge et al. | Nov. 10, | 1936 |
| 2,298,980 | Sloan et al. | Oct. 13, | 1942 |
| 2,416,680 | Curtis | Mar. 4, | 1947 |
| 2,539,768 | Anderson | Jan. 30, | 1951 |
| 2,707,308 | Taylor et al. | May 3, | 1955 |

FOREIGN PATENTS

| | | | |
|---|---|---|---|
| 352,379 | Great Britain | July 9, | 1931 |

OTHER REFERENCES

Tappi: Series 23, pp. 192–198, June, 1940 No. 1.